United States Patent Office 3,567,778
Patented Mar. 2, 1971

3,567,778
PROCESS FOR PREPARING NITROSALICYL-HYDRAZIDES
David F. Gavin, Cheshire, Conn., assignor to Olin Corporation
No Drawing. Filed June 17, 1968, Ser. No. 737,293
Int. Cl. C07c *103/33*
U.S. Cl. 260—559          5 Claims

ABSTRACT OF THE DISCLOSURE

The manufacture of nitrosalicylic hydrazides by the reaction of a hydrazine with lower alkyl esters of nitrosalicylic acid is improved by the addition to the reaction mixture of substantially stoichiometric amounts of an alkali metal hydroxide.

---

This invention relates to improvements in the manufacture of nitrosalicylic hydrazides by reacting a hydrazine with a lower alkyl ester of nitrosalicylic ester in the presence of a substantially stoichiometric quantity of an alkali metal hydroxide.

In the prior art, the preparation of 3,5-dinitrosalicylic hydrazide has been described by Haksar et al., Vikram, J. Vikram Univ. 4, No. 3,133–5 (1960); Chemical Abstracts 58. 6740–1 (1963). The compound was prepared by refluxing a mixture of methyl 3,5-dinitrosalicylate and hydrazine hydrate in a methanol solution. The molar ratio of hydrazine to ester was 7.25:1.

The art further discloses in Journal of the American Medical Association, v. 203, No. 13, page 1124, (Mar. 25, 1968) the 5-nitrofurfurylidene hydrazone of 3,5-dinitrosalicylic hydrazide, useful as a veterinary growth stimulant and as a histomonocide. Veterinary growth stimulants are used by incorporating minor amounts, for example, one percent in grain, meat or other animal feed. The histomonocides are used, similarly incorporated in the feed or water for fowl, particularly domestic fowl, to prevent or treat infection by Histomonas. The dinitrosalicylic hydrazides prepared by the process of this invention are useful in the manufacture of nitrofurfurylidene hydrazones for this end use. Such hydrazones are prepared in known manner from the hydrazide and nitrofurfuraldehyde. Other hydrazones are similarly prepared from other aldehydes or other carbonyl compounds.

The object of this invention is to improve on the prior art process for preparing nitrosalicylic hydrazides and more particularly to reduce the ratio of hydrazine necessary for the preparation. Hydrazine is an expensive reagent and it is a further object of this invention to reduce the cost of the preparation without sacrificing yield or purity of product.

Experiments showed that reduction of the ratio of hydrazine to ester in the preparation of the hydrazide by the process of Haksar et al. gives satisfactory yields when the molar ratio is as low as 4:1. Lower ratios, for example, 3.5:1 or lower, result in a product which is impure and difficult to purify. The added cost of purification more than equals the cost of using a higher ratio of hydrazine to ester.

The process of the present invention provides a method for producing nitrosalicylic hydrazides from a hydrazine and a lower alkyl ester of nitrosalicylic acid by reacting the hydrazine and ester in an aqueous reaction mixture containing a suitable quantity, preferably about stoichiometric amounts, of an alkali metal hydroxide. The use of methanol or any other organic solvents is avoided and the method is carried out in an aqueous medium. The proportion of water used is not critical but solutions of from 0.1 molar to 10 molar can be used.

The process of the present invention is suitable for the preparation of the hydrazides of various nitrosalicylic acids including, for example, 3-nitrosalicylic acid, 5-nitrosalicylic acid, 6-nitrosalicylic acd and 3,5-dnitrosalicylic acid. Suitable lower alkyl esters of the nitrosalicylic acids include those having 1 to 8 carbon atoms in the lower alkyl group. Examples include the methyl, ethyl, isopropyl, sec.-butyl and 2-ethylhexyl esters.

In the process of this invention, the hydrazine is suitably hydrazine itself or any aryl or lower alkyl substituted hydrazine. Mono- or di-substituted hydrazines are suitable but when two substituents are present, they are preferably on the same nitrogen, i.e., the hydrazine is unsymmetrically substituted. Aryl hydrazines suitably contain 6 to 10 carbons and the lower alkyl hydrazines suitably contain 1 to 8 carbons. Examples of suitably substituted hydrazines include monomethylhydrazine, isopropylhydrazine, 2-ethylhexylhydrazine, 1,1-dimethylhydrazine, phenylhydrazine, p-bromophenylhydrazine and alpha-naphthylhydrazine.

When hydrazine itself is used in the process of this invention, it is suitably used in the form of anhydrous hydrazine or its hydrate or more dilute aqueous solutions of hydrazine. The preferred source of hydrazine is the commercially available 100% hydrate containing 60% of $N_2H_4$.

The preferred quantity of alkali metal hydroxide is about the stoichiometric proportion of 1:1 based on the ester, but the proportion of alkali metal hydroxide is suitably within the limits of from 0.6:1 to 1.2:1 on a molar basis. Any of the alkali metal hydroxides are suitable including lithium hydroxide, rubidium hydroxide and cesium hydroxide but economically sodium and potassium hydroxide are preferred. Sodium hydroxide is the cheapest of these and is most preferred.

When desired, it is convenient to supply the hydrazine compound to the reaction mixture in the form of a salt of the hydrazine. In this embodiment of the invention, additional alkali metal hydroxide is supplied which is stoichiometrically sufficient to convert the hydrazine salt to the free base. Salts suitable for use in this embodiment include the salts of any of the above-defined hydrazines with the common inorganic acids. More particularly, suitable examples include hydrazine hydrochloride, hydrazine sulfate and monomethylhydrazine hydrochloride.

While the reaction proceeds slowly at room temperatures, it is expeditious to warm the reaction mixture to about 50° to 100° C. A temperature of 60° to 65° C. is especially suitable.

It is an advantage of the improvement of the present invention that no flammable solvents, for example, methanol are used in the process and it is carried out in aqueous solution. A further advantage of the process of this invention is that the molar ratio of hydrazine to the nitrosalicylic ester is preferably about stoichiometric, but is suitably from about 0.9:1 to 2:1. By avoiding the necessity for such a large excess of hydrazine as used in the prior art, it is a further advantage of the process of this invention that the expensive reagent is not wasted and it is not necessary to recover excess hydrazine.

EXAMPLE I

To a solution of 13.3 parts by weight (0.33 mole) of sodium hydroxide in 500 parts of water was added 80.6 parts (0.33 mole) of methyl 3,5-dinitrosalicylate and the mixture was heated to 65° C. At this temperature, 20.8 parts of 100% hydrazine hydrate (0.416 mole of $N_2H_4$) was added slowly over a period of 1.25 hours. Heating was continued for 6 additional hours at 60° to 62° C. Then 20.6 parts (0.413 equivalent) of concentrated $H_2SO_4$ in 50 parts of water was added. The mixture was cooled and the precipitated yellow solid was filtered, washed with water and methanol. The resulting 3,5-dinitrosalicylic hydrazide amounted to 60.0 parts and had a melting point of 236–7° C., corresponding to the value reported by Haksar et al.

EXAMPLE II

To a solution of 14.6 g. (0.36 mole) of sodium hydroxide in 250 ml. of water was added 80.6 g. (0.33 mole) of methyl 3,5-dinitrosalicylate. The mixture was heated to 70° C. and 200 ml. of additional water was added to give a clear red solution. At this temperature, 20 ml. of 100% hydrazine hydrate in 200 ml. of water was added drop-wise over a period of one hour. Heating was continued for an additional 5 hours at 75° C. Then 17.9 g. of concentrated $H_2SO_4$ in 50 ml. of water was added and the mixture was cooled. The precipitated yellow solid was filtered, giving a yield of 50 g. of 3,5-dinitrosalicylic hydrazide.

What is claimed is:

1. In the manufacture of a nitrosalicylic hydrazide by reacting a hydrazine reagent with a lower alkyl ester of a nitrosalicylic acid, the improvement of reacting a hydrazine reagent selected from the class consisting of hydrazine and mono and disubstituted aryl and lower alkyl hydrazines, said aryl hydrazines being selected from the group consisting of phenyl, naphthyl, halogenated phenyl and halogenated naphthyl hydrazines and said alkyl hydrazines having 1 to 8 carbons, said ester selected from the class consisting of lower alkyl esters of 3-nitrosalicylic acid, 5-nitrosalicylic acid, 6-nitrosalicylic acid and 3,5-dinitrosalicylic acid, said lower alkyl having 1 to 8 carbons, and the molar ratio of said hydrazine reagent to said ester being from 0.9:1 to 2:1, in an aqueous medium containing dissolved alkali metal hydroxide in a molar ratio of said hydroxide to said ester of from 0.6:1 to 1.2:1.

2. The process as claimed in claim 1 in which the molar ratio of said hydroxide to said ester is from 0.9:1 to 1.1:1.

3. The process as claimed in claim 1 in which the reaction is carried out at a temperature between room temperature and 100° C.

4. The process as claimed in claim 1 in which said ester is methyl 3,5-dinitrosalicylate and said hydrazide is 3,5-dinitrosalicylic hydrazide.

5. The process as claimed in claim 1 in which said hydrazine is hydrazine hydrate.

References Cited
UNITED STATES PATENTS 2,763,684    1956    Beman _____ 260—559

HENRY R. JILES, Primary Examiner

H. I. MOATZ, Assistant Examiner

U.S. Cl. X.R.
424—324